April 14, 1925.  
F. H. VICK  
1,533,151  
RADIALLY OPENING FIRE SHUTTER  
Filed May 25, 1921
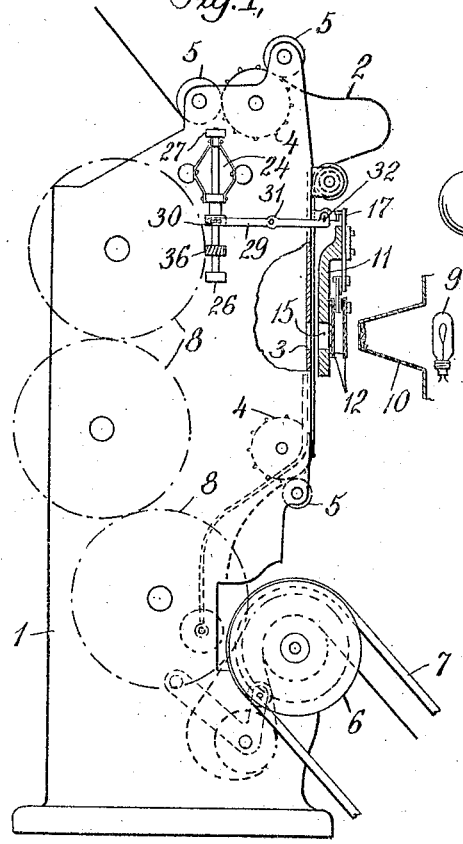
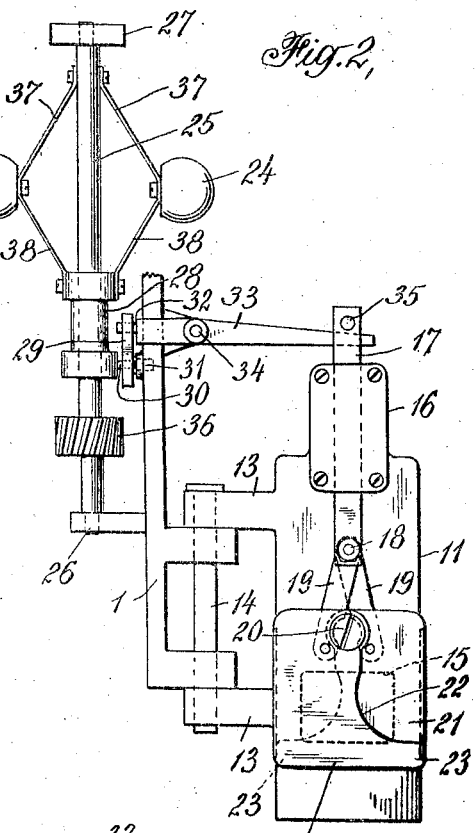
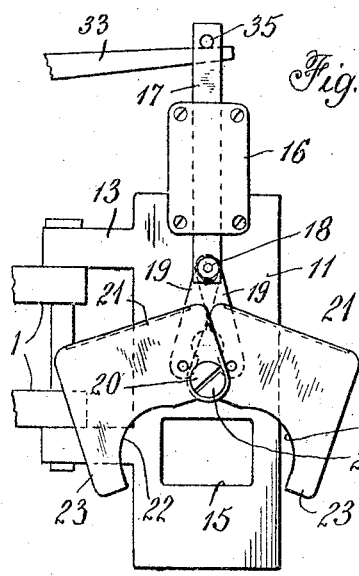
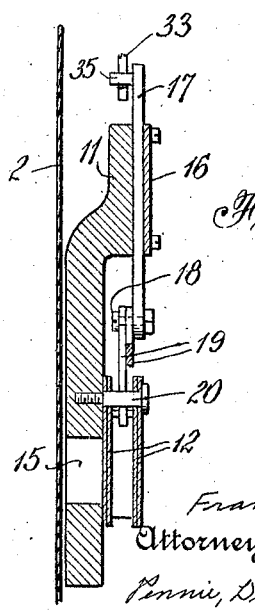
Inventor  
Frank H. Vick  
Attorneys  
Pennie, Davis, Marvin & Edmonds Patented Apr. 14, 1925.

1,533,151

UNITED STATES PATENT OFFICE.

FRANK H. VICK, OF NEW YORK, N. Y., ASSIGNOR TO NICHOLAS POWER COMPANY, INC., OF NEW YORK, N. Y., A CORPORATION OF DELAWARE.

RADIALLY-OPENING FIRE SHUTTER.

Application filed May 25, 1921. Serial No. 472,465.

*To all whom it may concern:*

Be it known that I, FRANK H. VICK, a citizen of the United States, residing at 548 East 147th St., city of New York, in the county of Bronx and State of New York, have invented certain new and useful Improvements in Radially-Opening Fire Shutters; and I do hereby declare the following to be a full, clear, and exact description of the invention, such as will enable others skilled in the art to which it appertains, to make and use the same.

The present invention relates to improvements in moving picture projectors, and is particularly applicable for use in projectors employing an incandescent lamp as the lighting element.

The type of lighting element commonly employed in moving picture projectors is the ordinary carbon arc. Such a light is particularly adapted for use in the projection of pictures due to its relatively small emitting area. These features render the light from such a source easy to focus and, due to the high intensity of the light, the arc may be satisfactorily operated at an appreciable distance from the film. The disadvantages of the carbon arc, however, such as the necessity for frequent adjustment and replacement of electrodes, lack of reliability for continuous service over a considerable period of time, excessive heating of parts in the neighborhood of the arc, and the like, are well known in the art, and in order to avoid these disadvantages the use of incandescent lamps as the lighting elements is rapidly gaining favor.

The intensity of light over the emitting surface of the filament in an incandescent lamp is very much less than that of the light emitting area in an arc, and consequently a relatively large filament area is required for the projection of a given quantity of light. In order to obtain the intensity required it is desirable to place the lamp as near to the film as possible, and for that purpose it is necessary that there be no rearwardly projecting parts back of the film gate to prevent the lamp house being adjusted close to the film.

It is a principal object of the present invention to provide a fire shutter for use in motion picture projectors which requires no appreciable clearance between the projector and the lamp house for its operation, and consequently permits the light source to be placed in close proximity to the film, and in which the shutter and its controlling and actuating mechanism are so mounted as to normally permit the shutter to remain in closed position under the influence of gravity alone, the shutter members being pivoted at a point above the projector aperture.

It is also an object of the invention to provide a shutter of the above type which permits of thorough ventilation for the purpose of dissipating the heat derived from the light source and preventing excessive heating of the parts exposed to the direct influence of the light.

It is also an object of the invention to provide a fire shutter for use in picture projectors which is automatically actuated, is quick and dependable in its operation, and whose parts may be conveniently located within the projector in otherwise unused space.

I have illustrated a preferred embodiment of my invention in the accompanying drawings, in which Fig. 1 is a longitudinal sectional view of a picture projector, largely diagrammatic, embodying my invention; Fig. 2 is an elevational view showing the details of construction of my improved fire shutter, the shutter being shown in the closed position; Fig. 3 is a detail view showing the shutter in the open position; and Fig. 4 is a sectional elevation through the rear wall of the projector showing the details of my invention.

Referring to the drawings, particularly to Fig. 1, 1 indicates the frame of the "mechanism" or head which is mounted upon the usual support, not shown, in any well known manner. The film 2 is fed through the projector past the aperture 3 by means of sprocket wheels 4 and guide rolls 5, the film-driving mechanism being furnished with power from a drive pulley 6 kept in motion through a belt 7 leading from an electric motor or other convenient power source (not shown). Gears 8, shown diagrammatically in Fig. 1, constitute a part of the film-driving mechanism and serve primarily to transmit power to that part of the mechanism located in the upper portion of the projector. In line with the aperture 3 are positioned the light source and the condenser tube, indicated diagrammatically at 9 and 10, respectively, these parts being mounted in a lamp house support in a position to direct light upon the film and from thence to the screen.

Mounted on the outer side of the gate 11 which holds the film taut at the aperture and positioned between the film and the light is my improved shutter 12, the details of which are best shown in Figs. 2 and 3. The gate 11 which is provided with the usual tension shoes, not shown, has hinge brackets 13 working on a rod 14 fixed in lugs projecting from the adjacent side web of the machine frame 1. In the lower portion of the gate 11 there is provided an opening 15 in line with the projection aperture 3. At the upper end of the member 11 there is secured a metal piece 16 forming between it and the member 11 a passage or guideway for a link or a rod 17 and permitting this rod a sliding vertical movement. At the lower end of rod 17 there is provided a pivot pin 18 supported by rod 17 and carrying links 19 having holes in their upper ends adapted to fit over the pivot pin 18, these links being independently movable and each one freely rotatable about the pin 18.

A pin or a spindle 20 is rigidly attached to member 11 just above the opening 15. Pivotally mounted upon this spindle for movement in planes parallel to the plane of the opening 15 are two members 21 constituting the shutter for controlling the admission of light to the film. The parts of the shutter may be of any desired shape such that the light is totally excluded from the film when the shutter is in its closed position, while the aperture will be completely uncovered when the shutter is opened. The shutter members are here shown as substantially rectangular in shape and having circular arcs 22 formed at their inner edges and tongues 23 extending inwardly at their lower portions, the purpose of the tongues being to counterbalance the upper parts of the shutter portions so as to reduce the resistance of the members to rotative movement particularly at the beginning of the movement.

The lower ends of the links 19 are pivotally attached to the respective plates 21 at points somewhat outside of the center line of link 17. With this arrangement, when an upward pull is exerted on link 17 the force is transmitted to links 19 and a pull is exerted on the members 21 in the direction of links 19. The pivot points being offset from the center about which the shutter members rotate, the shutter will open, the amount of force required depending upon the extent to which the pivot points are offset. The shutter is retained in open position by maintaining the upward pull upon link 17. If this pull is released the shutter will immediately close by reason of the weight of the members 21, their centers of gravity being located at a considerable distance from their axis of rotation thus affording a large turning moment to aid in bringing them into closed position.

The shutter is operated by means of a ball governor 24 mounted on the projector frame in a convenient position. The governor shaft 25 is mounted to rotate in a step bearing 26 attached rigidly to the frame 1, a lateral support being provided at some point, as at 27, to maintain the shaft in a vertical position. A spiral gear 36 is fitted upon the shaft 25 and meshes with one of the gears 8 constituting the film-driving mechanism, the speed of the governor thus being directly proportional to the speed of the film-driving mechanism.

The upper ball supports 37 of the governor are rigidly attached to the shaft 25 and the lower ball supports 38 are attached to the collar 28 which is slidable vertically on the shaft, the collar rising when the speed of the governor increases and the balls are forced outwardly and falling when the speed of the governor decreases. A lever 29 is attached to the lower portion of the collar 28, a pin 30 being provided on the collar and adapted to work in a slot provided at the inner end of the lever. The lever 29 is pivoted to the projector frame at some portion of its length as at 31, and has its outer end slotted to receive a pin 32 projecting from the end of a second lever 33 extending at right angles to the lever 29, that is, in parallelism with that face of the projector upon which the member 11 is mounted. The lever 33 is pivoted to the frame at 34. The other end of lever 33 is adapted to engage the under side of a pin 35 provided in the upper end of link 17.

The parts 21 of the shutter are preferably made of sheet metal of substantially U-shaped cross-section to thereby provide, particularly when the shutter is closed, an open ended air passage through which a brisk circulation of air will be maintained by the heat of the projection lamp, thus effectually cooling the metal.

The operation of my improved shutter will be clear from the above description. When the film-driving mechanism is set in motion and its speed increases the governor balls 24 will be thrown outwardly, thus raising the collar 28 along the shaft 25. As collar 28 is raised, the inner end of the pivoted link 29 is also raised and its outer end is simultaneously lowered, thus exerting a downward pull upon the pin 32 and causing link 33 to swing about its pivot and exert an upward pressure upon pin 35, which serves to lift the link 17 and consequently raise the shutter to its open position. The particular governor speed at which the opening of the shutter is effected may be adjusted to any predetermined value by regulation of the governor in the ordinary manner. As long as the governor is maintained above this predetermined speed the mechanism will continue to exert an upward pull on the link 17 and the shutter will be maintained in the open position. When the governor drops below this predetermined speed links 29 and 33 will no longer be held in place and the weight of the shutter members 21 will serve to drop them into closed position and immediately shut off the light from the film.

While I have described and illustrated a preferred embodiment of my invention it is to be understood that details of construction such as the particular arrangement of links, location of parts within the projector, and the link, may be varied within the full scope of the appended claims.

I claim:

1. In a picture projector having a projecting light and a film-driving mechanism, a safety shutter comprising a pair of shutter blades pivoted above the projection aperture and adapted to normally hang under the influence of gravity alone in depending position and in such relation as to completely cover said aperture, a centrifugally actuated governor operated by the film-moving mechanism, said governor having a slidable portion assuming various positions depending upon the speed of operation and means for swinging said shutter blades in opposite directions to uncover said aperture by reason of the movement of said slidable member.

2. In a motion picture machine having a film-moving mechanism, a projection aperture and a gate for the film at the aperture, a centrifugal shutter therefor comprising a pair of shutter blades mounted on said gate in position to cover the aperture therein, means for simultaneously moving said shutter blades away from each other comprising a common operating member mounted on said gate for vertical movement, a pin in said member, a centrifugally controlled operating lever extending over said gate, and a pin carried by said vertically movable member adapted to overly said lever when the gate is in closed position to be raised thereby when said lever is centrifugally operated and thereby open said shutter.

3. In a motion picture machine a safety shutter formed of sheet metal and comprising two transverse walls spaced apart and connected at their overlapping edges to provide a substantially unobstructed air passage through the shutter when the shutter is closed.

4. In a motion picture machine, a safety shutter comprising two oppositely movable members, each formed of a single piece of sheet metal, shaped to provide two transverse walls spaced apart and connected only at a vertical edge to thereby leave an unobstructed vertical passage between the two transverse walls.

In testimony whereof I affix my signature.

FRANK H. VICK.